(12) United States Patent
Boys et al.

(10) Patent No.: US 9,071,061 B2
(45) Date of Patent: Jun. 30, 2015

(54) INDUCTIVE POWER TRANSFER APPARATUS

(75) Inventors: John Talbot Boys, Auckland (NZ);
Grant Anthony Covic, Auckland (NZ);
Chang-Yu Huang, Auckland (NZ);
Mickel Bipin Budhia, Auckland (NZ)

(73) Assignee: Auckland Uniservices Ltd., Auckland (NZ)

( * ) Notice: Subject to any disclaimer, the term of this patent is extended or adjusted under 35 U.S.C. 154(b) by 876 days.

(21) Appl. No.: 13/138,298

(22) PCT Filed: Feb. 5, 2010

(86) PCT No.: PCT/NZ2010/000018
§ 371 (c)(1),
(2), (4) Date: Oct. 17, 2011

(87) PCT Pub. No.: WO2010/090539
PCT Pub. Date: Aug. 12, 2010

(65) Prior Publication Data
US 2012/0025602 A1 Feb. 2, 2012

(30) Foreign Application Priority Data

Feb. 5, 2009 (NZ) .......................... 574677
Apr. 8, 2009 (NZ) .......................... 576137

(51) Int. Cl.
*H01F 38/00* (2006.01)
*H02J 5/00* (2006.01)
*B60L 11/18* (2006.01)
*H01F 38/14* (2006.01)
*H02J 7/02* (2006.01)

(52) U.S. Cl.
CPC .............. *H02J 5/005* (2013.01); *H01F 38/14* (2013.01); *H02J 7/025* (2013.01); *Y02T 90/122* (2013.01); *B60L 11/182* (2013.01); *Y02T 10/7005* (2013.01); *Y02T 90/14* (2013.01)

(58) Field of Classification Search
USPC ................................................... 307/104
See application file for complete search history.

(56) References Cited

U.S. PATENT DOCUMENTS

| 4,873,677 A | 10/1989 | Sakamoto et al. |
| 6,906,495 B2 | 6/2005 | Cheng et al. |
| 7,042,196 B2 | 5/2006 | Ka-Lai et al. |
| 7,525,283 B2 | 4/2009 | Cheng et al. |

(Continued)

FOREIGN PATENT DOCUMENTS

| JP | 4246331 | 9/1992 |
| JP | 666206 | 9/1994 |

(Continued)

OTHER PUBLICATIONS

New U.S. Patent Application entitled Inductive Power Transfer Apparatus filed concurrently herewith.

(Continued)

*Primary Examiner* — Rexford Barnie
*Assistant Examiner* — Dru Parries
(74) *Attorney, Agent, or Firm* — Law Office of Richard F. Jaworski P.C.

(57) ABSTRACT

A magnetic flux pad for receiving or generating magnetic flux. The pad includes two pole areas (11, 12) associated with a magnetically permeable core 14. Coils 17 define the pole areas. The pad allows useable flux to be generated at a significant height above a surface of the pad.

18 Claims, 13 Drawing Sheets

(56) References Cited

U.S. PATENT DOCUMENTS

| | | | |
|---|---|---|---|
| 8,035,255 | B2 | 10/2011 | Kurs et al. |
| 2009/0189565 | A1 | 7/2009 | Cheng et al. |

FOREIGN PATENT DOCUMENTS

| | | |
|---|---|---|
| JP | 686321 | 12/1994 |
| JP | H0837121 | 2/1996 |
| JP | 1197263 | 4/1999 |
| JP | 2000200725 | 7/2000 |
| JP | 2000269059 | 9/2000 |
| JP | 2002343655 | 11/2002 |
| JP | 200447701 | 2/2004 |
| JP | 2005525705 | 8/2005 |
| WO | WO 2005024865 | 3/2005 |
| WO | WO 2007126321 | 11/2007 |
| WO | WO 2008051611 | 5/2008 |
| WO | WO 2008140333 | 11/2008 |

OTHER PUBLICATIONS

U.S. Patent Application entitled Inductive Power Transfer Apparatus filed Feb. 5, 2010, U.S. Appl. No. 13/138,299.

INDUCTIVE POWER TRANSFER APPARATUS

The present application is based on and claims the benefit of International Application Number PCT/NZ2010/000018 filed on Feb. 5, 2010, which claims priority from New Zealand Application 574677 filed Feb. 5, 2009 and New Zealand Application 576137 filed Apr. 8, 2009 and the entire contents of each of which are herein incorporated by reference.

FIELD OF THE INVENTION

This invention relates to apparatus for generating or receiving magnetic flux. The invention has particular, but not sole, application to a low profile, substantially flat device, such as a pad, for power transfer using an Inductive Power Transfer (IPT) system.

BACKGROUND

IPT systems, and use of a pad including one or more windings that may comprise the primary or secondary windings for inductive power transfer, are introduced in our published international patent application WO 2008/140333, the contents of which are incorporated herein by reference. One particular application of IPT power transfer pads is electric vehicle charging. IPT power transfer pads are used both in the vehicle as a power "pick-up" device (i.e. the secondary side winding of the IPT system), and at a stationary location such as a garage floor as the "charging pad" (i.e. the primary side winding) from which power is sourced.

In the development of pick-ups for inductively charging electric vehicles a problem of some concern is the clearance available under the vehicle. With conventional pick-up circuits power in sufficient quantities can be provided at distances up to perhaps 100 mm at which time the coupling factor becomes so small that it becomes impractical.

It is generally conceded that the power required to charge a typical electric vehicle overnight is about 2.0 kW, so that in an overnight charging mode some 24 kWH can be transferred. With modern electric vehicles this is enough energy to travel more than 100 km and is ideal for small vehicles used for tasks such as dropping children at schools, running errands, short commutes and the like.

Figure 1:
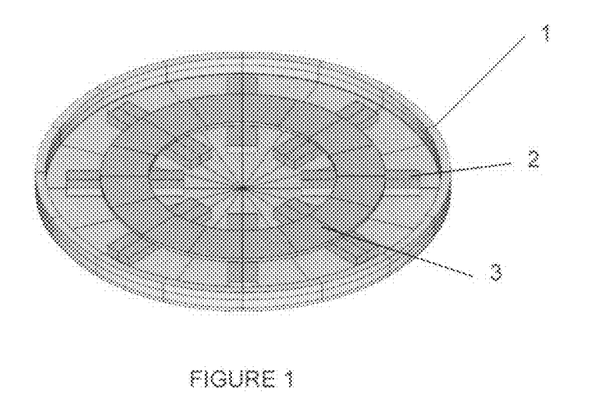
FIG. 1 is a perspective view of part of a known form of IPT power transfer pad.
Figure 2:
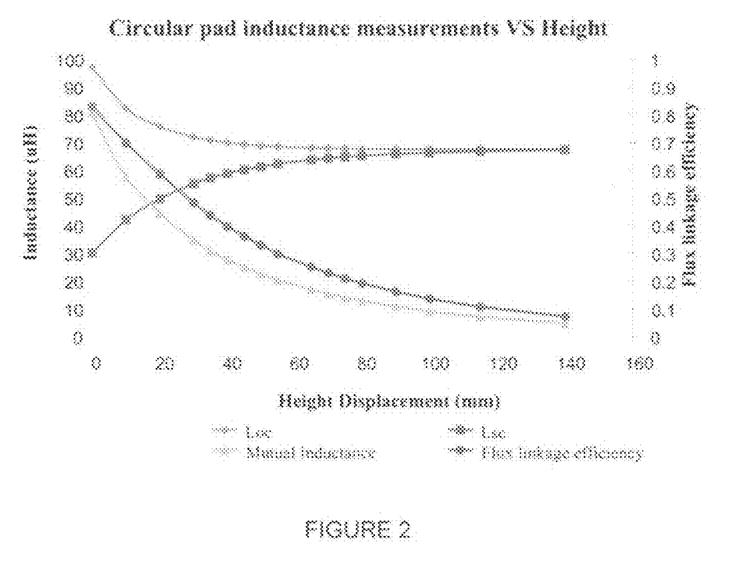
FIG. 2 is a graph of inductance measurements and flux linkage efficiency with respect to height displacement for a pad such as that of FIG. 1.

Inductively coupled chargers commonly use two power pads that are circular in shape and may have dimensions of 400 mm diameter by 25 mm thick as shown in FIG. 1. However, to use an inductive charger such as this the vehicle must be positioned relatively accurately over the charging pad—typically within 50 mm of perfect alignment—and the separation between the power pad on the vehicle and the power pad on the ground must be closely controlled. In principle inductive power transfer may be accomplished for vertical spacings between 0 mm and 100 mm but if the system is set up for 100 mm it will have quite a large reduction in power at 120 mm and will be inoperable below 50 mm. This state of affairs occurs because both the self inductance and the mutual inductance of the power pads vary widely as the distance between the pads changes. The self inductance and the mutual inductance as a function of the separation for two identical circular pads that have the construction of FIG. 1, are shown in FIG. 2. Thus at 100 mm the power pad receiver or pick-up may have a pick-up voltage of 100 V and a short circuit current of 5.0 A for a power rating of 500 W. If the IPT system electronics operates with a Q factor of 4, then 2 kW can be transferred to the battery though there are still difficulties to overcome in producing the power needed at the appropriate battery voltage.

The induced voltage in the pick-up pad (i.e. the vehicle mounted power pad) is very separation sensitive—corresponding to the variation in mutual inductance shown in FIG. 2—so that at 120 mm it is reduced by approximately 40% while at 50 mm it is increased by a factor of 2. A reduction in power means that the vehicle does not get fully charged in the usual time, but the more challenging situation is that at smaller separations the power transferred may be so high that the components of the circuit are overloaded. Also, as the separation is reduced the self inductance of the pick-up coil also changes so that the circuit operates off-frequency putting extra stress on the power supply. As the separation gets smaller still this stress on the power supply caused by the non-tuned pick-up on the primary side cannot be sustained and the system must be shut down. In practice it is feasible to operate with a separation between 40 and 100 mm but a larger range is too difficult.

A range of separation from 40 to 100 mm is quite small. If the vehicle has a relatively high ground clearance then either the power pad on the vehicle has to be lowered or the power pad on the ground has to be raised. Automatic systems for doing this compromise the reliability of the charging system. Alternatively the pad on the ground can be on a fixed but a raised platform but such a pad is a tripping hazard when a car is not being charged and this situation is generally to be avoided in a garage or other location involving vehicles and pedestrians.

Figure 3:
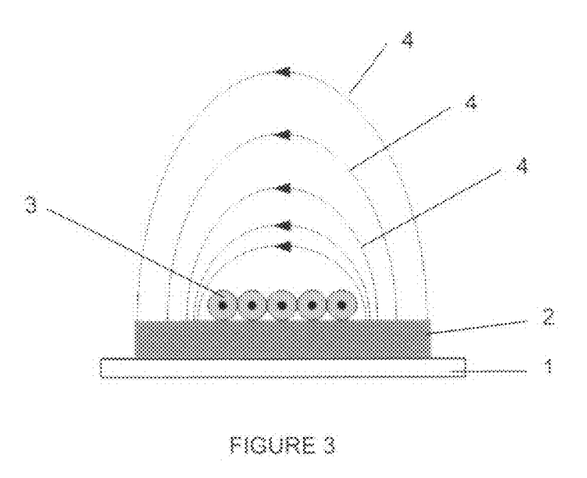
FIG. 3 is a diagrammatic elevation in cross section of a part of the pad of FIG. 1 showing flux lines.
Figure 4:
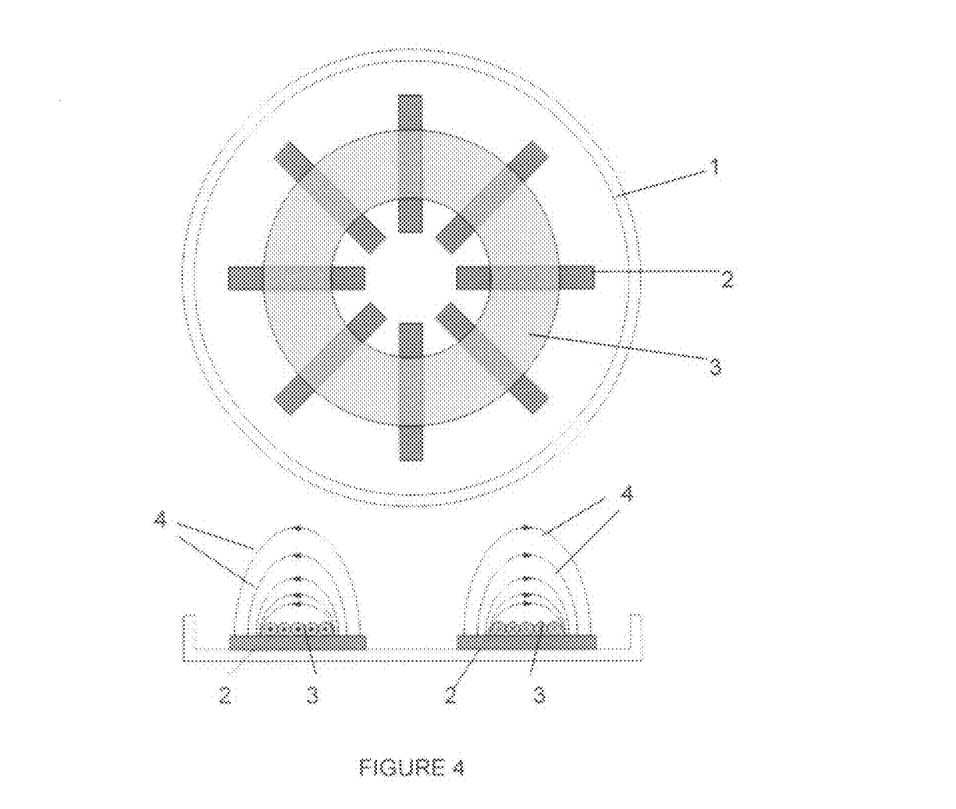
FIG. 4 is a plan view and elevation of a cross section of the pad of FIG. 1 showing flux lines.

The known power pad construction of FIG. 1 comprises an aluminium case 1 containing typically eight ferrite bars 2 and a coil 3. Current in the coil causes magnetic flux in the ferrite bars and this flux has flux lines that start on the ferrite bars and propagate to the other end of the bar in a path containing the coil that may be thought of as a semi-elliptical shape. The flux lines 4 for a single bar are shown in FIG. 3. The flux lines leave the ferrite in an upward direction and propagate to the other end of the bar, entering it at right angles. No flux goes out the back of the pad as the solid aluminium backing plate 1 prevents it. In the actual pad the eight bars give a flux pattern shown approximately in cross section in FIG. 4. A simulation of the actual flux pattern is shown in FIG. 4A.

Figure 4A:
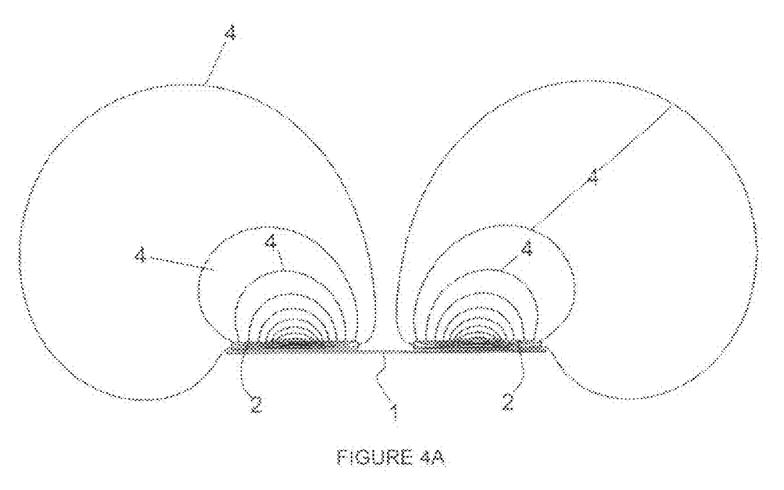
FIG. 4A is an elevation in cross section of a computer generated simulation of the magnetic field (indicated by flux lines) of the pad of FIG. 1.

From FIG. 4A it can be seen that at the highest point the flux lines are essentially horizontal. Therefore, to get the maximum separation possible between the primary pad and the secondary pad it would be advantageous to detect this horizontal flux. However, the horizontal flux is still relatively close to the pad (extending from the pad approximately one quarter of the diameter of the pad) and there is no horizontal flux at all at the very centre of the power pad. Thus at the very point where maximum flux density would be ideal—the centre—the actual usable horizontal flux component is zero.

SUMMARY

It is an object of the invention to provide an improved apparatus or method for inductive power transfer, or an improved IPT power transfer pad, or to at least provide a useful alternative.

Accordingly in one aspect the invention provides a magnetic flux pad having a front face and a back face for generating or receiving magnetic flux in or from a space beyond the front face, the pad comprising:
 two pole areas for sending or receiving flux,
 a magnetically permeable core,
 two coils magnetically associated with the core, whereby the flux enters the pad at one of the pole areas and exits the pad at the other pole area.

The coils are flat coils in one embodiment, and each coil may define one of the pole areas.

The coils may be spiral wound coils.

In one embodiment the coils are located on a side of the core nearest to the front face of the pad, and the coils and the core together form a flux path in the pad.

The core may comprise lengths of permeable material, such as ferrite.

In one embodiment the turns of the coils are spread between the pole areas. In another embodiment the turns of the coils are concentrated at areas outside the region between the pole areas, such as the areas at the ends of the pad. The coils may each be asymmetric, the combination of windings of a coil being wider between the pole areas than at the periphery of the pad.

In one embodiment the coils are located immediately adjacent to each other in the region between the pole areas. The coils may touch each other at the region between the pole areas.

The coils may be shaped to provide the poles areas and a flux pipe between the pole areas. The coils may also be in substantially the same plane.

In a further aspect the invention provides a magnetic flux pad having a front face and back face for generating a magnetic flux in a space beyond the front face of the pad, the pad comprising:
two pole areas for sending or receiving flux,
a magnetically permeable core,
two coils associated with the core and being provided on a side of the core adjacent to the front face of the pad,
whereby the pad produces an arch shaped flux in the space such that essentially each line flux starts on one of the pole areas, arches to the second pole area and joins on itself through the core with essentially no flux present at the back face of the pad.

In a still further aspect the invention provides a magnetic flux pad having a front face and back face for receiving a magnetic flux from a space beyond the front face of the pad, the pad comprising:
two pole areas for sending or receiving flux,
a magnetically permeable core,
two coils associated with the core and being provided on a side of the core adjacent to the front face of the pad and adapted to receive a horizontal flux component,
and a further coil magnetically associated with the core and adapted to receive a vertical flux component.

In yet a further aspect the invention provides an IPT system including a magnetic flux pad according to any one of the preceding statements. The system may also include a transmitter pad and a receiver pad according to the preceding statements.

The IPT system may supply power to an electric vehicle.

In a further aspect the invention provides an IPT power transfer magnetic flux transmitter or receiver including:
a magnetic flux carrying member having a relatively high magnetic permeability and having two ends, two windings electromagnetically associated with the flux carrying member, and the flux carrying member having two flux transmission or reception regions, one region being provided adjacent to each end, whereby magnetic flux exists or enters the flux carrying member substantially only at or adjacent to the transmission or reception regions.

Further aspects of the invention will become apparent from the following description.

DRAWING DESCRIPTION

One or more embodiments are described below by way of example with reference to the accompanying drawings, in which.

DESCRIPTION OF EMBODIMENTS

A new concept in IPT power transfer arrangements is now disclosed. The embodiments described in this document relate to flux transmission and reception apparatus. These are commonly (although not necessarily) provided in the form of a discrete unit which may conveniently be referred to as power transfer pads i.e. arrangements that may be portable and which typically have a greater extent in two dimensions relative to a third dimension so that they may be used in applications such as electric vehicle charging where one pad is provided on a ground surface (such as a garage floor) and another in the vehicle. However, the disclosed subject matter may also be provided in other arrangements including permanent structures such as a roadway for example, and does not need to take the form of a pad. Like reference numerals refer to like features throughout the description.

Figure 5A:
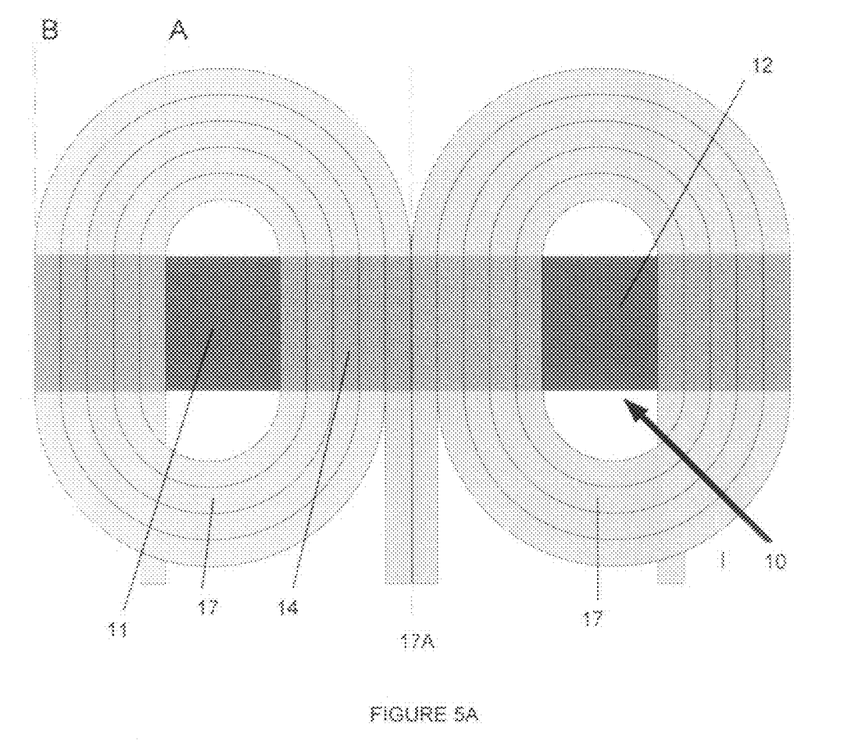
FIG. 5A is a plan view of an embodiment of inductive power transfer apparatus which may be provided in the form of a pad.

Referring to the arrangement of FIG. 5A, a pad is shown which uses a novel "flux pipe", generally referenced 10, to connect two separated flux transmitter/receiver regions comprising pole areas 11 and 12. The flux pipe provides a generally elongate region of high flux concentration from which ideally no flux escapes. The flux pipe 10 in this embodiment has a core 14 which includes a magnetically permeable material such as ferrite to attract flux to stay in the core. With electric circuits there is a large difference between the conductivity of conductors—typically $5.6 \times 10^7$ for copper; and air—in the order of $10^{-14}$—but this situation does not pertain with magnetic fields where the difference in permeability between ferrite and air is only the order of 10,000:1 or less. Thus in magnetic circuits leakage flux in air is always present and this has to be controlled to get the best outcome.

Flat coils or windings 17 sit on top of the core 14 to provide the flux pipe. There is no straight path through the flux pipe that passes through the coils 17. Instead, the arrangement of the coils 17 means that flux entering the pad through one of the areas 11 or 12 propagates through the relevant coil 17 into the core 14 from where it propagates along the core, then exits the pad out through the other area 12 or 11, and completes its path through air back to the first area 11 or 12 to form a complete curved flux path. The flux path so formed is essentially completely above a front surface of the pad and extends into a space beyond the front surface. The arrangement of coils 17 also means that there is essentially no flux extending beyond a rear face of the pad. Thus, the orientation of the windings 17 ensures that the flux path is directed in a curve out into a space in front of the front surface of the pad, and the spread or distributed nature of the coils 17 across the upper surface of the core 14 ensures that the flux in the centre of the pad is primarily constrained within the core. The coils 17 also define the spaced apart pole areas so that the flux is guided into and out of the pad via the pole areas and forms an arch shaped loop in the space beyond the front surface of the pad to provide a significant horizontal flux component at a significant distance above the front surface of the pad.

In a preferred embodiment there are two coils 17 in close proximity to each other. The coils 17 are spiral wound. In the diagrammatic embodiment illustrated in FIGS. 5A to 5C the coils 17 take the form of Archimedean spirals, and are touching along the centre line 17A. The flux pipe 10, comprising core 14, extends to the ends of the coils 17. The coils 17 are substantially planar and are arranged in substantially the same plane on one side of the core 14. The actual length of the core 14 is not critical—in one embodiment it should include the centre line of the coils 17 and should extend past the hole in the centre of each coil to at least the position indicated by A. The core 14 may extend under the coil 17 to position B or even further. The holes in the coils 17 define the pole areas 11 and 12 which function as flux receiver/transmitter regions for the pad.

Figure 5B:
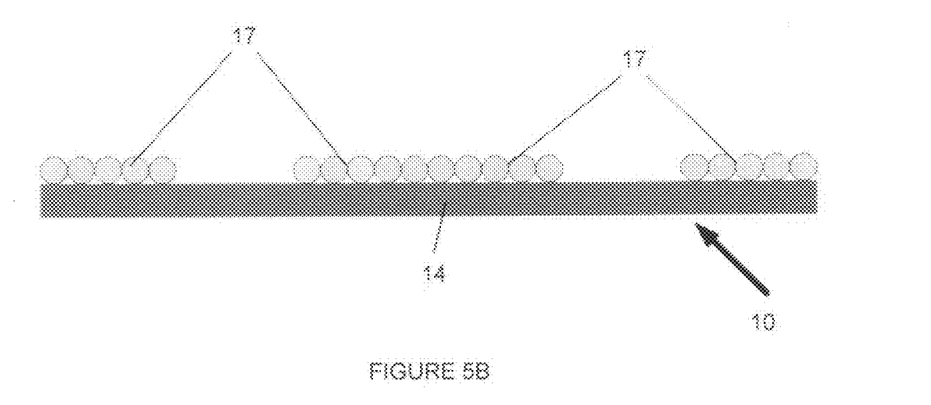
FIG. 5B is a side elevation of the apparatus of FIG. 19A.
Figure 5C:
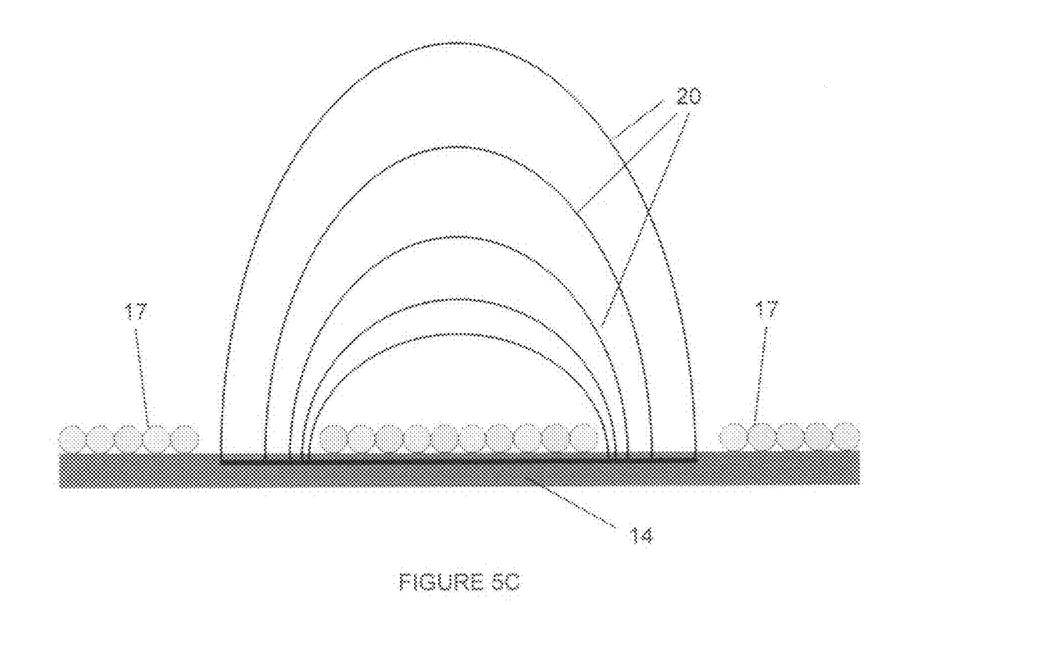
FIG. 5C is a view of FIG. 5B but also showing flux lines.
Figure 7A:
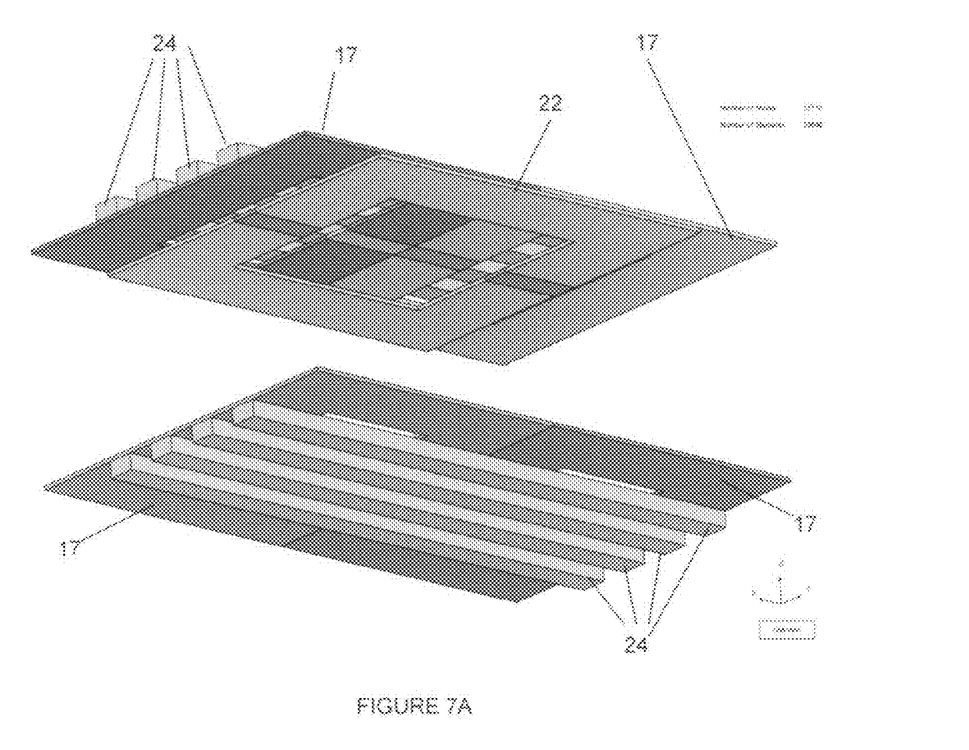
FIG. 7A is an isometric view from below of a flux transmitter and flux receiver (oriented above the flux transmitter).
Figure 7B:
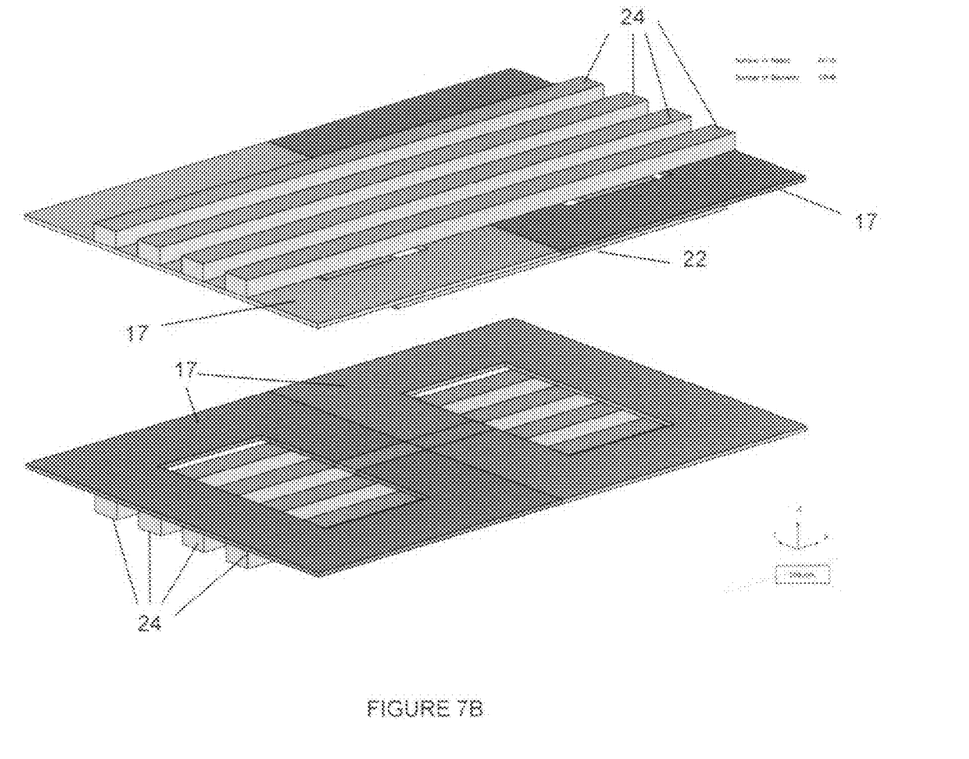
FIG. 7B is an isometric view from above of the arrangement of FIG. 7A.

In one embodiment the core 14 is made of ferrite bars in strips or lengths (not shown in FIGS. 5A-C, but illustrated in FIGS. 7A and 7B). Air-gaps are acceptable between the strips, which simplifies manufacture. The ideal flux paths 20 are shown in FIG. 5C and are only on one side of the core 14 which is an ideal situation. In principle there is ideally no flux extending out the rear face of the pad (i.e. on the side of the core 14 opposite to the side on which coils 17 are mounted) and therefore no aluminium screen or other flux repelling member is required. However, in practice a light screen may be used in some embodiments as errors and imperfections in the ferrite bars comprising the core 14 can cause small leakage fluxes that should be contained.

Figure 5D:
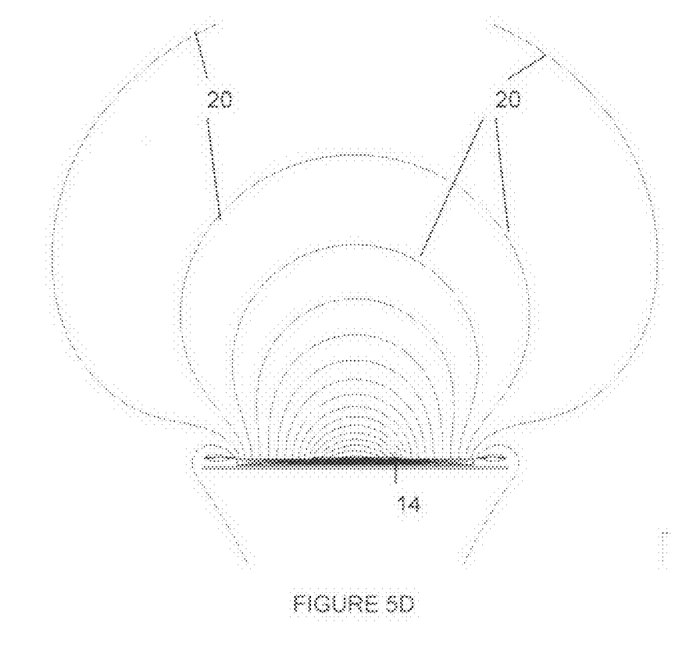
FIG. 5D is a computer simulation of s cross section through a pad according to FIGS. 5A-5C illustrating the flux lines generated by such a pad in use.

FIG. 5D shows the result of a simulation of the pad construction in FIGS. 5A-5C when used to generate a magnetic field. As can be seen, the flux path follows a generally arch shape through the space beyond the front surface of the pad.

Inductive power transfer pads according to the arrangement described immediately above are very easy to use as the leakage flux from them is very small. They can be placed quite close to metallic objects without loss in performance, and they are largely unaffected by connecting wires etc.

Second Embodiment

In a further embodiment it may be noted that the arrangement of the coils in a receiver or pick-up pad mounted horizontally on a vehicle, for example, makes the pick-up pad sensitive to a first direction of the flux which is longitudinally directed (i.e. having a direction parallel to the core 14, and being in the X-axis direction with reference to the drawings) with respect to the flux generator (the horizontally oriented transmitter pad). To improve the magnetic coupling of the receiver with respect to misalignment, a "second" coil can be arranged that is sensitive to a second component of the flux that is preferably vertical with respect to the stationary transmitter.

Figure 6:
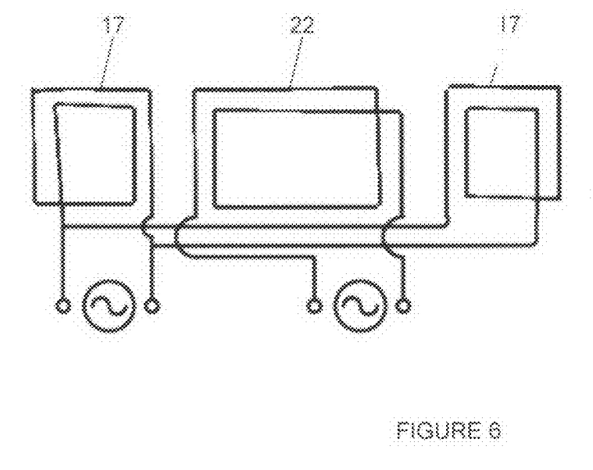
FIG. 6 is a diagrammatic illustration of an electrical wiring diagram for a further embodiment of inductive power transfer apparatus including a centre, or quadrature coil.

FIG. 6 shows an electrical schematic of a further embodiment of a receiver pad with a "horizontal" flux sensitive coil 22 now positioned in the centre and the outer two coils 17 connected out of phase to produce a further coil sensitive to the vertical component.

For the receiving pad of FIGS. 5A-5C a further flat coil 22 can also be placed above the flux pipe with one suitable arrangement shown in FIGS. 7A and 7B, coil 22 being sensitive to the vertical component of the field. As in the original pick-up structure, this additional coil exists only on one side of the core 14 and therefore ideally maintains all of the flux lines on the side of the receiver directed towards the transmitter.

As shown in FIGS. 7A and 7B, only the receiver is modified with a centre, or quadrature, coil 22. This second coil is particularly sensitive to misalignment in the X-direction (i.e. the horizontal longitudinal direction), but not in the Y-direction (being the horizontal transverse direction perpendicular to the core 14). This complements the original receiver which is sensitive to misalignment in the Y-direction, but which because of its structure is less sensitive to movement in the X-direction. The combined output of both receiver coils enhances the sensitivity of the receiver enabling the receiver to be positioned nominally in the ideal position and still couple the required power. FIGS. 7A and 7B also show an arrangement of spaced ferrite rods or bars 24 that comprise core 24.

Figure 8A:
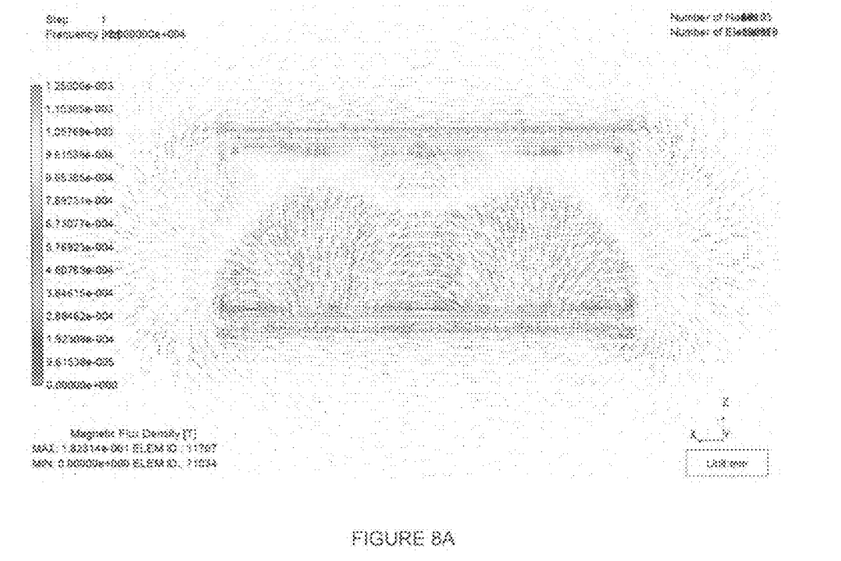
FIG. 8A shows flux lines based on a simulation of the arrangement of FIGS. 7A and 7B when the transmitter and receiver are aligned with a 200 mm separation between the transmitter and receiver.
Figure 8B:
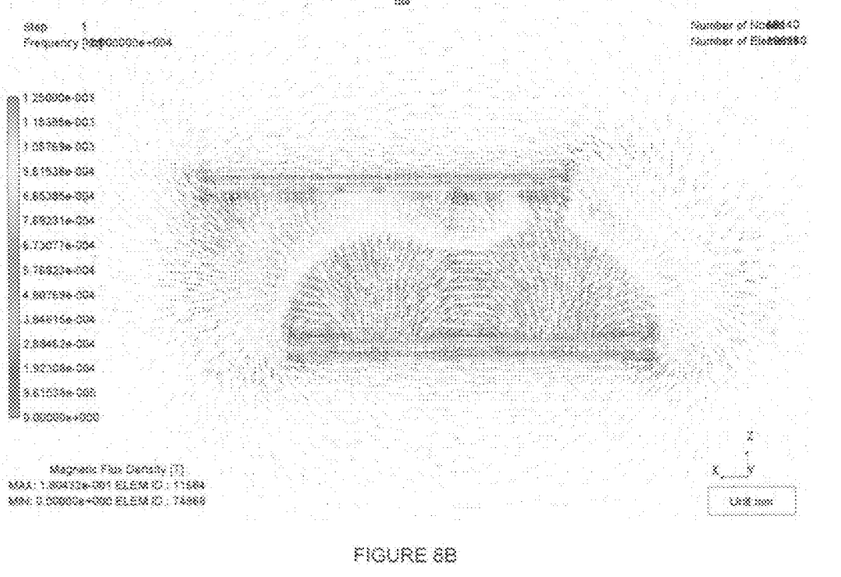
FIG. 8B shows flux lines based on a simulation of the arrangement of FIGS. 7A and 7B when the transmitter and receiver are misaligned in the X axis direction.

As an example, the flux lines using the pad design as shown in FIGS. 7A and 7B without any form of compensation are shown in FIGS. 8B and 8A with and without some misalignment. Here the transmitter pad and receiver pad are identical except for the addition of the second "vertical flux" coil (i.e. coil 22 of FIGS. 7A and 7B) in the receiver pad. The transmitter and receiver pads both have length 588 mm and width 406 mm and are separated vertically by 200 mm. The current in the coils of the transmitting pad is 23 amps at 20 kHz. Notably the majority of the flux exists between the transmitter pad and receiver pad while a very small leakage flux is shown to exist outside this area. In FIG. 8A these flux lines couple the first receiver coil, while in FIG. 8B the majority of the flux lines couple the second receiving coil (i.e. coil 22 of FIGS. 7A and 7B) thereby enhancing the output power capability of the pick-up.

Figure 9:
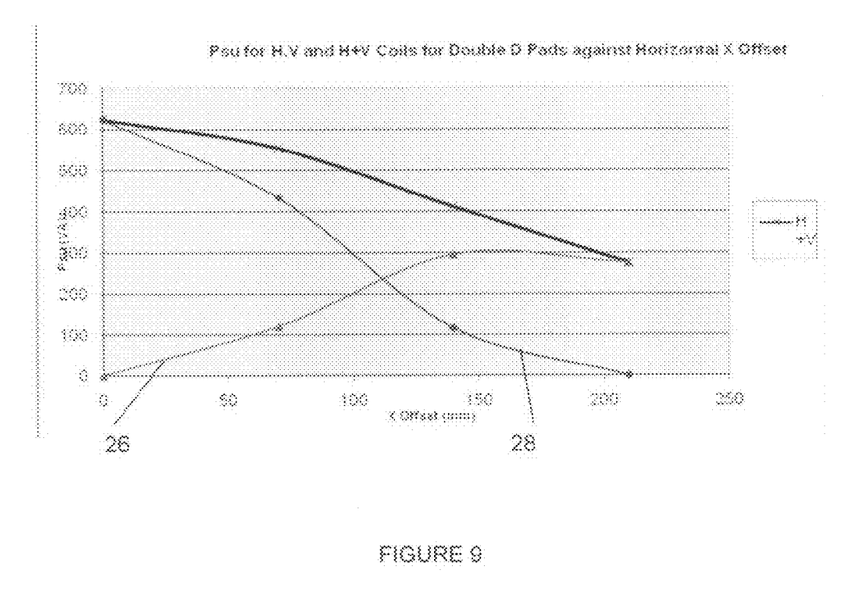
FIG. 9 is a diagram of power against displacement in the X axis direction for the arrangement of FIGS. 7A and 7B.
Figure 10:
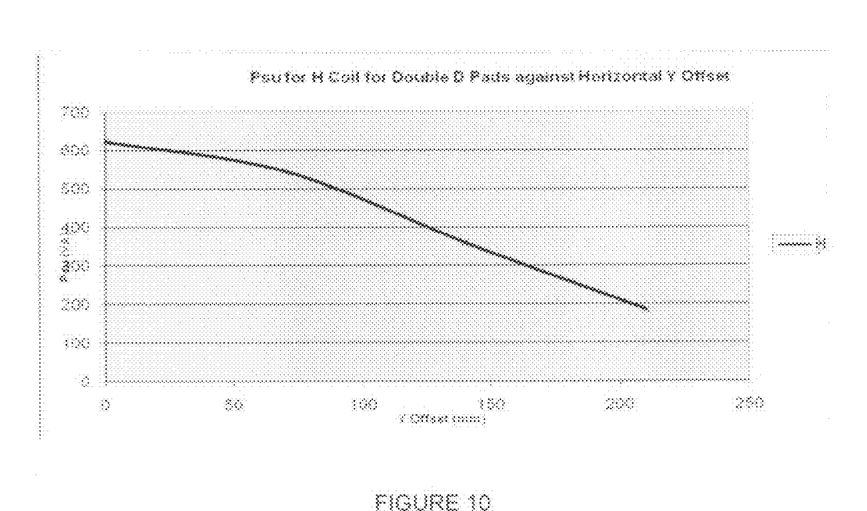
FIG. 10 is a diagram of power against displacement in the Y axis direction for the arrangement of FIGS. 7A and 7B.

In FIGS. 9 and 10 the VA generated from the output of the receiver pad coils with and without misalignment is also shown. In FIG. 9 the total and separate VA contribution of receiver coils from a magnetic simulation of the pads shown in FIGS. 7A and 7B is shown when the receiver pad is misaligned (relative to its ideal position centred above the transmitter pad) in the X direction. In FIG. 9 curve 26 represents the VA contribution of coil 22, curve 28 represents the combined VA contribution of coils 17, and the remaining curve represents the total from coils 17 and 22. As noted the second coil 22 substantially enhances the output so that if a 2 KW output were required at 0 X-offset the required electronic tuning must boost the VA output by around 3.2. At 140 mm X-offset the required electronic boost (Q) without coil 22 is more than 17 times (which is practically difficult due to the sensitivity of the tuning required) whereas with coil 22 an effective boost of around 4.8 is required and that is easily achieved.

Coil 22 is not expected to be sensitive in the Y direction when the receiver is positioned with 0 offset in the X direction. This is verified in the magnetic simulations shown in FIG. 10 where there is shown to be no contribution to the total power from the coil 22. This is however not required as the combined output of coils 17 is naturally sensitive in this direction. At 140 mm offset in the Y direction, a 2 KW output is possible with an electronic tuning (Q) of around 5.5.

Third Embodiment

Figure 11:
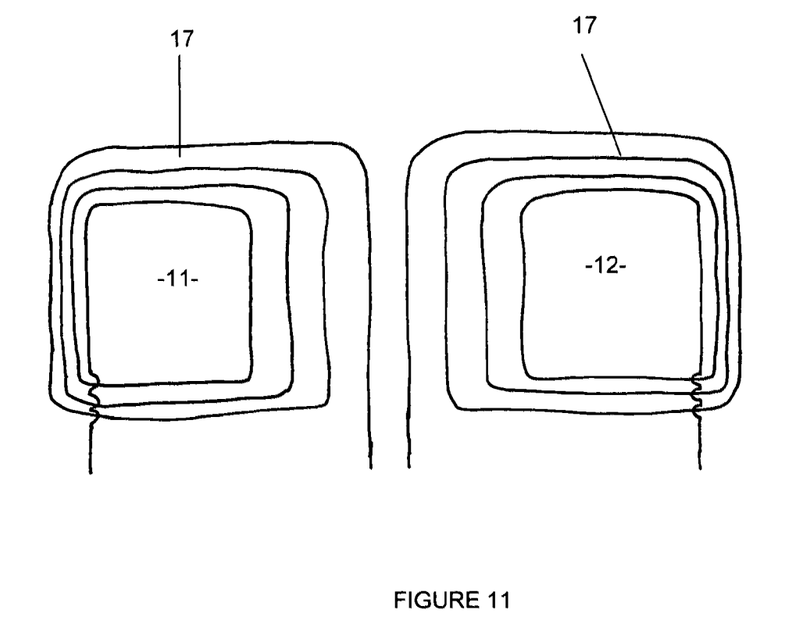
FIG. 11 is an illustrative diagram of a winding arrangement for coils of a pad of the preceding figures.

Turning now to FIG. 11, a winding arrangement for coils 17 is shown diagrammatically. In this embodiment the individual turns in the coils 17 are spread at that end of each winding nearer the centre of the pad relative to the ends of the pad. Thus the coils 17 are each asymmetric, the combination of windings of a coil being wider between the pole areas than at a periphery of the pad. This embodiment allows greater separation of the pole areas 11 and 12 (and thus greater flux extension beyond the front face of the pad). The spacing between the pole areas 11 and 12 may be made larger by using an oval or rectangular cross section litz wire wound on the narrow edge for the pole areas and wound on the flat edge for the central flux pipe region between the pole areas.

Alternatively if the coils are wound with a round wire the spacing between the pole areas 11 and 12 may be made larger using gaps between the windings of the flux pipe section between the pole areas. However, we have found that gaps in the individual windings over the flux pipe section are to be treated with care as they can leave holes that flux can leak through spoiling the efficiency of the flux pipe. We have found that it is preferable to keep the windings evenly spaced and if there are gaps they should be typically less than one half to one wire diameter to keep flux losses to a minimum. In practice we have found that the convenience of the simple round wire makes this the technology of choice.

In yet another embodiment, the shape of the windings 17 may assist in obtaining greater pole area separation. For example, the coils 17 may be wound in an approximately triangular shape with the apex of each triangle facing the centre of the pad.

Figure 12:
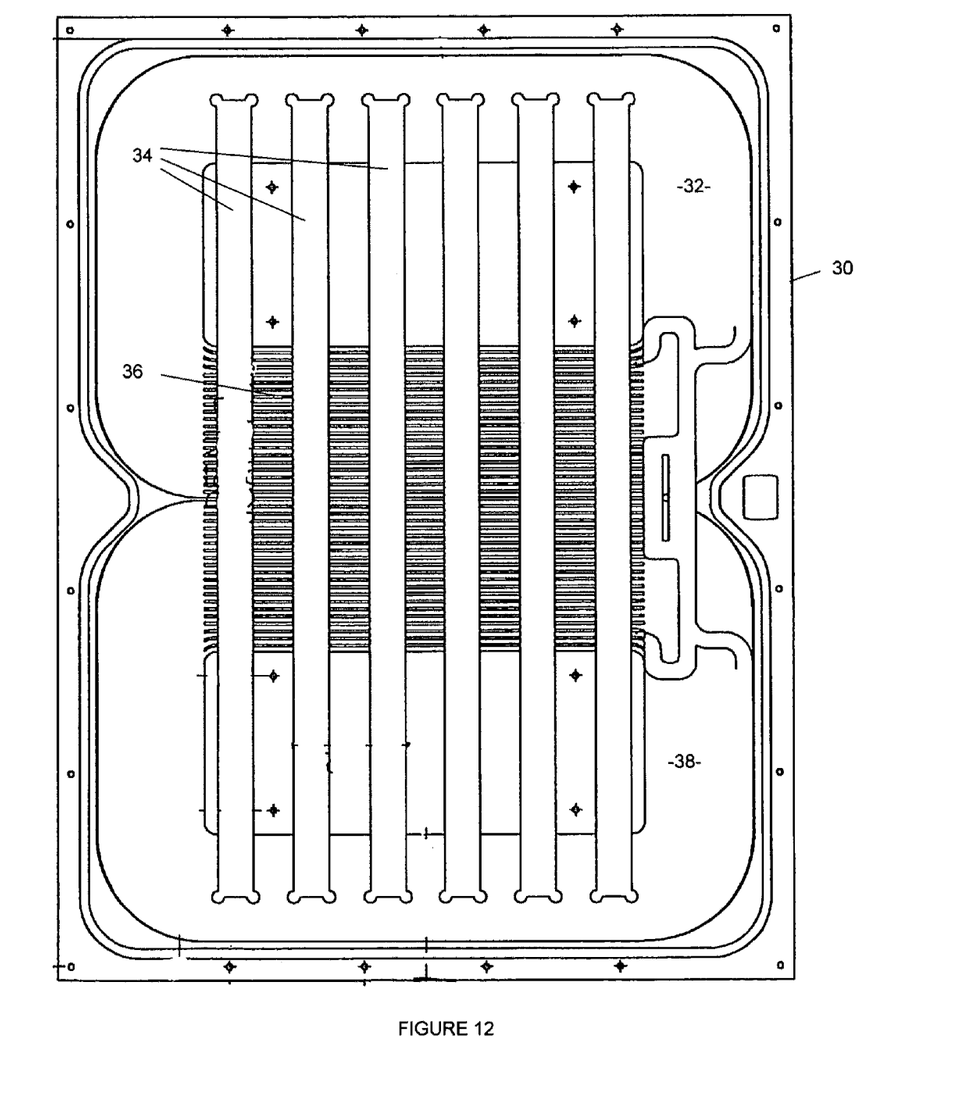
FIG. 12 is a plan view of a former or support plate for construction of a pad according to the preceding figures.
Figure 13:
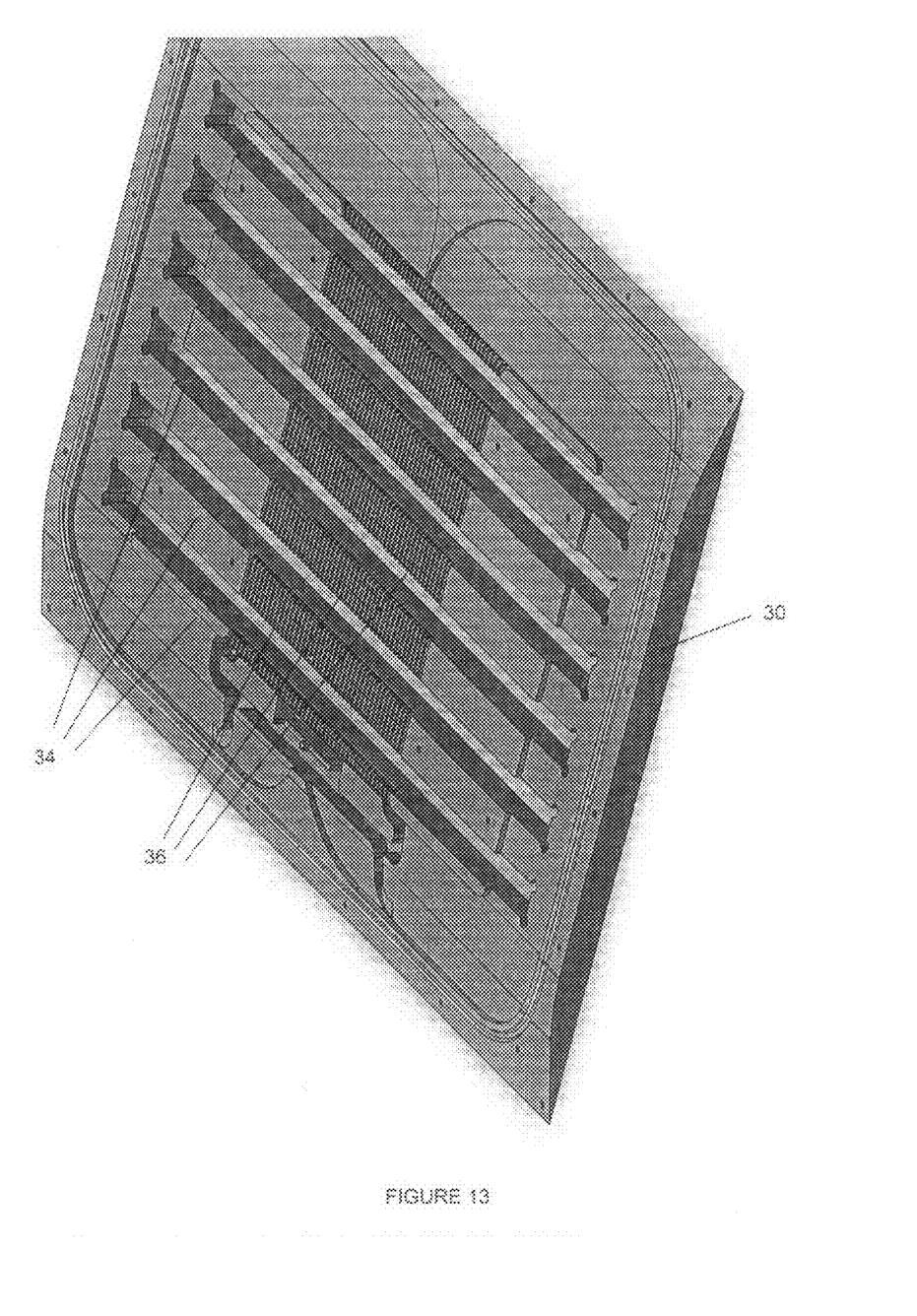
FIG. 13 is an isometric view of the former of FIG. 12.

Referring now to FIG. 12, a former or support plate 30 for providing a pad including the winding layout of FIG. 11 is shown in plan view. The former 30 may be constructed from any non permeable material, such as a plastic for example. The former 30 includes a first general region 32 for forming and supporting one of coils 17 (not shown) and a second region 38 for forming and supporting the other of the coils 17. Depressions 34 are provided for locating and supporting ferrite bars or other permeable members. Grooves 36 receive the individual wires that comprise the turns of coils 17 and ensure that the turns are correctly spaced. For clarity, an isometric representation of the former 30 is shown in FIG. 13.

Figure 14:
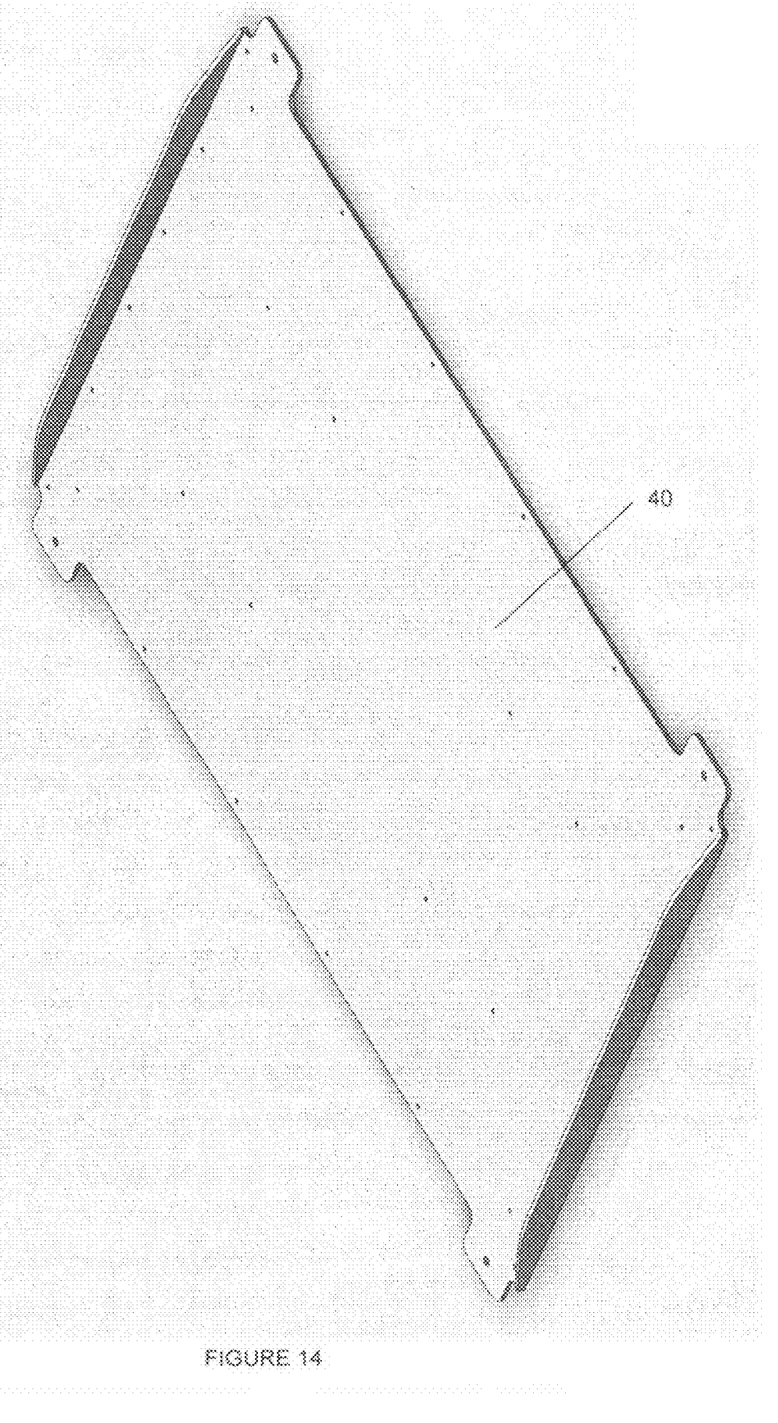
FIG. 14 is an isometric view of a backing plate adapted for attachment to the rear of the former shown in FIGS. 12 and 13.

FIG. 14 shows a backing plate 40 adapted for location on a rear surface of the former 30 i.e. for location on a side of the former that is opposite the side on which the coils 17 are located, and adjacent to a rear surface of the pad. Backing plate 40 may be constructed from a flux repelling material, for example aluminium. It is not necessary for prevention of flux exiting the rear face of a pad in use, since the design of the flat coils 17 and their location on the core 14 substantially directs the flux into a space in front of the front surface of the pad. However, plate 40 can provide additional structural support for the pad. Plate 40 can also act to prevent any changes in the magnetic properties of the pad (for example a change in inductance) should the pad be mounted in use adjacent to a magnetically permeable material for example.

The dimensions of the former 30 are approximately 790 mm by 600 mm by 25 mm, and a pad constructed from such a former will have very similar dimensions.

Further Practical Considerations

In practice it is prudent to ensure that the voltage at the terminals of the pad does not reach unsafe levels. Therefore in some embodiments, capacitance may be added in series with the windings inside the pad to lower the inductance seen at the pad terminals and therefore control the voltage at these terminals to be within suitable limits (say 300-400V). Without this the terminal voltage could be several KV which is undesirable and potentially unsafe. Capacitance can be placed in series with the windings at nearly any convenient place with the apparatus. Thus in some embodiments one or more capacitors can be placed in series with the windings at the terminal points inside the pad housing, and in other embodiments capacitors can be distributed along the windings by breaking the winding into suitable sections with series capacitances in case the internal voltages on a single coil are ever too high.

Therefore, the invention provides a low profile device, referred to herein as a pad, which can be used as a magnetic flux generator that can be used to generate useful flux a significant distance from the device. The device can also be used as a receiver of flux to thereby produce electric energy from the received field. The ability of the pad to generate or receive flux over a significant distance is particularly useful for charging or energising an electric vehicle.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A magnetic flux pad for loosely coupled inductive power transfer, the pad having a front face and a back face for generating or receiving magnetic flux in or from a space beyond the front face, the pad comprising:
two pole areas,
a magnetically permeable material,
two coils magnetically associated with the magnetically permeable material and each coil defining one of the pole areas, wherein the magnetically permeable material concentrates magnetic flux in the pad between the pole areas whereby magnetic flux is constrained in the permeable material between the pole areas and is guided into and out of the pad via the pole areas to form an arch shaped flux path in the space beyond the front face to transfer power to devices at various distances within the space beyond the front face of the pad.

2. A magnetic flux pad as claimed in claim 1 wherein the coils are flat coils.

3. A magnetic flux pad as claimed in claim 1 wherein the coils are spiral wound coils.

4. A magnetic flux pad as claimed in claim 1 wherein the coils are located on a side of the core nearest to the front face of the pad.

5. A magnetic flux pad as claimed in claim 1 wherein the coils and the magnetically permeable material together form a flux path in the pad.

6. A magnetic flux pad as claimed in claim 1 wherein the magnetically permeable material comprises lengths of permeable material.

7. A magnetic flux pad as claimed in claim 6 wherein the permeable material comprises ferrite.

8. A magnetic flux pad as claimed in claim 1 wherein the coils are each asymmetric, a combination of windings of a coil being wider between the pole areas than at a periphery of the pad.

9. A magnetic flux pad as claimed in claim 1 wherein the coils are located immediately adjacent to each other in the region between the pole areas.

10. A magnetic flux pad as claimed in claim 1 wherein the coils are shaped to provide the poles areas and a flux pipe between the pole areas.

11. A magnetic flux pad for loosely coupled inductive power transfer, the pad having a front face and hack face for generating a magnetic flux in a space beyond the front face of the pad, the pad comprising:
two pole areas for sending or receiving flux,
a magnetically permeable core,
two coils associated with the core and being provided on a side of the core adjacent to the front face of the pad,
whereby the pad produces an arch shaped flux in the space such that essentially each line flux starts on one of the pole areas, arches to the second pole area and joins on itself through the core with essentially no flux present at the back face of the pad to transfer power to devices at various distances within the space beyond the front face of the gad.

12. An IPT system comprising:
a magnetic flux pad for loosely coupled inductive power transfer, the pad having a front face and back face for generating a magnetic flux in a space beyond the front face of the pad to transfer power to devices at various distances within the space beyond the front face of the pad the pad comprising:
two pole areas for sending or receiving flux,
a magnetically permeable core,
two coils associated with the core and being provided on a side of the core adjacent to the front face of the pad,
whereby the pad produces an arch shaped flux in the space such that essentially each line flux starts on one of the pole areas, arches to the second pole area and joins on itself through the core with essentially no flux present at the back face of the pad; and
a magnetic flux pad having a front face and back face for receiving a magnetic flux from a space beyond the front face of the pad, the pad comprising:
two pole areas for sending or receiving flux,
a magnetically permeable core,
two coils associated with the core and being provided on a side of the core adjacent to the front face of the pad and adapted to receive a horizontal flux component,
and a further coil magnetically associated with the core and adapted to receive a vertical flux component.

13. A magnetic flux pad as claimed in claim 2 wherein each coil defines one of the pole areas.

14. A magnetic flux pad as claimed in claim 2 wherein the coils are spiral wound coils.

15. An IPT system including a magnetic flux pad according to claim 11.

16. An IPT system as claimed in claim 12 for supplying power to an electric vehicle.

17. A magnetic flux pad as claimed in claim 1 wherein at least part of each coil extends beyond the permeable material.

18. A magnetic flux pad as claimed in claim 1 wherein the permeable material has a length dimension extending between the pole areas and a width dimension transverse to the length dimension, and the permeable material does not extend beyond the coils in the width dimension.

* * * * *